United States Patent
Kim et al.

(10) Patent No.: US 12,027,663 B2
(45) Date of Patent: Jul. 2, 2024

(54) ION-CONDUCTIVE SOLID ELECTROLYTE COMPOUND, METHOD FOR PREPARING SAME, AND ELECTROCHEMICAL DEVICE COMPRISING SAME

(71) Applicant: Samsung Electronics Co., Ltd., Suwon-si (KR)

(72) Inventors: Seung-Joo Kim, Suwon-si (KR); Jaegyeom Kim, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 691 days.

(21) Appl. No.: 17/268,634

(22) PCT Filed: May 7, 2019

(86) PCT No.: PCT/KR2019/005406
§ 371 (c)(1),
(2) Date: Feb. 16, 2021

(87) PCT Pub. No.: WO2020/036290
PCT Pub. Date: Feb. 20, 2020

(65) Prior Publication Data
US 2021/0202988 A1    Jul. 1, 2021

(30) Foreign Application Priority Data

Aug. 16, 2018  (KR) ................. 10-2018-0095552

(51) Int. Cl.
*H01M 10/0562* (2010.01)
*H01M 8/1016* (2016.01)
(Continued)

(52) U.S. Cl.
CPC ..... *H01M 10/0562* (2013.01); *H01M 8/1016* (2013.01); *H01M 8/188* (2013.01);
(Continued)

(58) Field of Classification Search
CPC .......... H01M 10/0562; H01M 8/1016; H01M 8/188; H01M 10/0525; H01M 12/08
(Continued)

(56) References Cited

U.S. PATENT DOCUMENTS 6,696,204 B2 *   2/2004   Sato .................... H01M 10/052
429/316
7,846,587 B2   12/2010   Koh et al.
(Continued)

FOREIGN PATENT DOCUMENTS

CN   101040350 A   9/2007
CN   104003710 A   8/2014
(Continued)

OTHER PUBLICATIONS

Extended European Search Report dated Apr. 20, 2022 of EP Patent Application No. 19849390.0.
(Continued)

*Primary Examiner* — James M Erwin
(74) *Attorney, Agent, or Firm* — CANTOR COLBURN LLP (57) ABSTRACT

Provided is an ion-conductive solid electrolyte compound, as a crystalline oxide, including a stoichiometric formula of "$A_x(M_2TO_8)_y$". In the stoichiometric formula, A is a cation having an oxidation state of +1, M is a cation having an oxidation state of +4, +5, or +6, T is a cation having an oxidation state of +4, +5, or +6, and x and y are each independently a real number greater than 0, wherein x is equal to or less than 3y. The ion-conductive solid electrolyte compound has a high ionic conductivity and a low electronic conductivity.

19 Claims, 8 Drawing Sheets

(51) Int. Cl.
  *H01M 8/18* (2006.01)
  *H01M 10/0525* (2010.01)
  *H01M 12/08* (2006.01)
(52) U.S. Cl.
  CPC ....... *H01M 10/0525* (2013.01); *H01M 12/08* (2013.01); *H01M 2300/0071* (2013.01)
(58) Field of Classification Search
  USPC ...................................................... 429/188
  See application file for complete search history.

(56) References Cited

U.S. PATENT DOCUMENTS

| | | | |
|---|---|---|---|
| 8,092,941 B2 | 1/2012 | Weppner et al. | |
| 9,450,271 B2 | 9/2016 | Weppner et al. | |
| 10,847,833 B2 | 11/2020 | Bunte et al. | |
| 2004/0204313 A1 | 10/2004 | Inoue | |
| 2013/0236813 A1 | 9/2013 | Heo et al. | |
| 2013/0337369 A1 | 12/2013 | Rosseinsky et al. | |
| 2015/0380765 A1 | 12/2015 | Fujieda et al. | |
| 2016/0149267 A1* | 5/2016 | Badding | H01M 10/36 429/185 |
| 2017/0331092 A1* | 11/2017 | Chen | H01M 10/0583 |
| 2018/0219221 A1 | 8/2018 | Yamauchi | |

FOREIGN PATENT DOCUMENTS

| | | |
|---|---|---|
| CN | 104069849 A | 10/2014 |
| JP | 2003024792 A | 1/2003 |
| JP | 2007528108 A | 10/2007 |
| JP | 2013543835 A | 12/2013 |
| KR | 1020070014141 A | 1/2007 |
| KR | 1020130103096 A | 9/2013 |
| KR | 1020170003783 A | 1/2017 |
| KR | 102018011196 A | 1/2018 |
| WO | 2005085138 A1 | 9/2005 |
| WO | 2009003695 A2 | 1/2009 |
| WO | 2017029945 A1 | 2/2017 |

OTHER PUBLICATIONS

V.V.Atuchin et al., "Shortest chemical bond length as a criterion for searching new noncentrosymmetric phosphate crystals," Ceramics International, May 8, 2004, pp. 2005-2009, vol. 30, Issue 7.

Imanaka et al., "High Li+ Conducting Ceramics", Acc. Chem. Res. 1994,27,265-270.

Inaguma et al, "High Ionic Conductiviry in Lithium Lanthanum Titanate", Solid State Comm. vol. 86, No. 10, 1993, pp. 689-693.

International Search Report for International application No. PCT/KR2019/005406 dated Aug. 8, 2019.

Kang Jin Young, "Crystal structure and ionic conductivities of phosphate bronze compounds and cyclosilicate compounds",Ajou University, 2016, 1-83.

Kim et al., "LiTa2PO8: a fast lithium-ion conductor with new framework structure", Journal of Materials Chemistry A, 2018, 6, 22478.

Kim et al., "Synthesis, crystal structures, and ionic transport properties of three-dimensional framework oxides, ATa2PO8(A=H, Li, and Na)", Graduate School of Ajou University, Department of Energy Systems Research, Applied Chemistry, Feb. 2019, pp. 1-142.

Japanese Office Action for Japanese Patent Application No. 2021-507894 dated Jun. 5, 2023.

Chinese Office Action for Chinese Patent Application No. 201980053887.1 dated Dec. 29, 2024.

* cited by examiner

ION-CONDUCTIVE SOLID ELECTROLYTE COMPOUND, METHOD FOR PREPARING SAME, AND ELECTROCHEMICAL DEVICE COMPRISING SAME

CROSS-REFERENCE TO RELATED APPLICATIONS

This application is a National stage application of PCT/KR2019/005406, filed on May 7, 2019, which claims priority to and the benefit of Korean patent application No. 10-2018-0095552, filed on Aug. 16, 2018, the contents of which in their entirety are incorporated by reference.

TECHNICAL FIELD

The present disclosure relates to a novel solid electrolyte compound having excellent ionic conductivity, a method of preparing the same, and an electrochemical device including the same.

BACKGROUND

Rechargeable lithium-ion secondary batteries are used in various application fields ranging from portable electronic devices to electric vehicles. However, because commercial lithium-ion batteries use flammable organic liquid electrolytes with low thermal stability, important problems arise in safety. In addition, when lithium dendrite grows in an organic electrolyte, problems of short-circuits occur in lithium-ion batteries.

In order to solve the above-described problems of organic liquid electrolytes, extensive research has been conducted into solid electrolyte materials. Safety may be considerably improved by replacing organic liquid electrolytes with non-volatile and thermally stable solid electrolytes. Solid lithium-ion electrolytes having high ionic conductivity and excellent mechanical strength may be applied to lithium-air (Li-Air) batteries, Li-redox flow batteries, Li—$H_2O_2$ semi-fuel cells, chemical sensors, and the like.

Particularly, crystalline oxides and sulfide compounds including lithium have been extensively studied as solid electrolytes. As typical sulfide-based solid electrolytes, there are argyrodite-based $Li_6PS_5I$, thio-LISICON-based $Li_{4-x}Ge_{1-x}P_xS_4$, and $Li_{10}GeP_2S_{12}$. These sulfide-based solid electrolytes have similar or higher lithium-ion conductivity than conventional liquid electrolytes. However, sulfide-based solid electrolyte compounds are sensitive to moisture. On the contrary, oxide-based solid electrolyte compounds have relatively excellent handling feasibility, mechanical properties, chemical properties, and thermal stability. As oxide-based lithium-ion solid electrolytes, perovskite-based $Li_{3x}La_{2/3-x}TiO_3$, NASICON-based $Li_{1.3}Al_{0.3}Ti_{1.7}(PO_4)_3$, and garnet-based $Li_7La_3Zr_2O_{12}$ have noticeable lithium-ion conductivity. Theses oxide-based solid electrolytes have lithium-ion conductivity of $1\times10^{-4}$ $Scm^{-1}$ at room temperature and are stable against air and moisture. $Li_{3x}La_{2/3-x}TiO_3$ that is a lithium-ion conductor having a perovskite structure is disclosed in an article by Liquan et al., entitled "High ionic conductivity in lithium lanthanum titanate" (Solid State Commun. 86, 689-693, 1993), and $Li_{1.3}Al_{0.3}Ti_{1.7}(PO_4)_3$ that is a lithium-ion conductor having a NASICON structure is disclosed in an article by Adachi et al., entitled "High $Li^+$ conducting ceramics" (Acc. Chem. Res. 27, 265-270, 2003). Lithium-ion conductors having a garnet structure are disclosed in International Patent Publication Nos. WO 2005/085138 and WO 2009/003695. However, conventional oxide-based solid electrolyte compounds have low ionic conductivity, and thus improvement thereof is needed.

SUMMARY

Provided is an ion-conductive solid electrolyte compound having excellent thermal and chemical stability, very high cation conductivity, and very low electronic conductivity.

Provided also is a method of preparing the ion-conductive solid electrolyte compound.

Provided also is an electrochemical device including an electrolyte layer formed of the ion-conductive solid electrolyte compound.

According to an aspect of the present disclosure, an ion-conductive solid electrolyte compound, as a crystalline oxide, has a stoichiometric formula represented by Formula 1 below.

$$A_x(M_2TO_8)_y \qquad \text{[Formula 1]}$$

In Formula 1, A is a cation having an oxidation state of +1, M is a cation having an oxidation state of +4, +5, or +6, T is a cation having an oxidation state of +4, +5, or +6, and x and y are each independently a real number greater than 0, wherein x is greater than 0 and equal to or less than 3y.

In an embodiment, the A may include at least one selected from a lithium ion ($Li^+$), a sodium ion ($Na^+$), a hydrogen ion ($H^+$), and a hydronium ion ($H_3O^+$), the M may include at least one selected from a titanium ion ($Ti^{4+}$), a zirconium ion ($Zr^{4+}$), a hafnium ion ($Hf^{4+}$), a niobium ion ($Nb^{5+}$), a tantalum ion ($Ta^{5+}$), and an antimony ion ($Sb^{5+}$), and the T may include at least one selected from a silicon ion ($Si^{4+}$), a germanium ion ($Ge^{4+}$), a phosphorus ion ($P^{5+}$), an arsenic ion ($As^{5+}$), a vanadium ion ($V^{5+}$), a sulfur ion ($S^{6+}$), a molybdenum ion ($Mo^{6+}$), and a tungsten ion ($W^{6+}$). In an embodiment, the T may include at least one selected from a germanium ion ($Ge^{4+}$), a phosphorus ion ($P^{5+}$), an arsenic ion ($As^{5+}$), and a vanadium ion ($V^{5+}$).

In an embodiment, in a crystal, M may be 6-coordinated by oxygen anions to form a $MO_6$ octahedral unit and T may be 4-coordinated by oxygen anions to form a $TO_4$ tetrahedral unit.

In an embodiment, the ion-conductive solid electrolyte compound may include: a first lattice layer formed of the $MO_6$ octahedral units linked to each other in a quadrilateral lattice shape along a first plane; a second lattice layer formed of the $MO_6$ octahedral units linked to each other in a quadrilateral lattice shape along a second plane parallel to the first plane; and a linking layer including trimer link units, in each of which one $MO_6$ octahedral unit and two $TO_4$ tetrahedral units, and the $MO_6$ octahedral unit is linked to the two $TO_4$ tetrahedral units by sharing two vertices, interposed between the first lattice layer and the second lattice layer, and binding to $MO_6$ octahedral units of the first lattice layer and $MO_6$ octahedral units of the second lattice layer, wherein the A is arranged in space between the $MO_6$ octahedral units and the $TO_4$ tetrahedral units.

In an embodiment, in each of the first and second lattice layers, 8 $MO_6$ octahedral units may be arranged at positions corresponding to 4 vertices and 4 sides of a quadrilateral, $MO_6$ octahedral units located at positions corresponding to 4 vertices may be linked to 4 $MO_6$ octahedral units adjacent thereto by sharing vertices, thereby forming a first octahedral unit, and $MO_6$ octahedral units located at positions corresponding to 4 sides may be linked to two $MO_6$ octahedral units adjacent thereto by sharing vertices, thereby forming a second octahedral unit.

In an embodiment, the second lattice layer may be shifted from the first lattice layer by a first interval and a second interval respectively in a first axis and a second axis defining the first plane and the second plane.

In an embodiment, the $MO_6$ octahedral unit of the trimer link unit may be linked to two second octahedral units respectively located at two sides connected to a first vertex of a first quadrilateral of the first lattice layer and two second octahedral units respectively located at two sides connected to a second vertex, opposite to a first vertex, of a second quadrilateral of the second lattice layer by sharing vertices therewith, one of the two $TO_4$ tetrahedral units of the trimer link unit may be linked to two second octahedral units respectively located at positions corresponding to two sides connected to a second vertex of the first quadrilateral and one first octahedral unit located at a position corresponding to the second vertex of the second quadrilateral by sharing vertices therewith, and the other of the two $TO_4$ tetrahedral units of the trimer link unit may be linked to one first octahedral unit located at a position corresponding to the first vertex of the first quadrilateral and two second octahedral units respectively located at positions corresponding to two sides connected to the first vertex of the second quadrilateral by sharing vertices therewith.

In an embodiment, each of the first and second lattice layers may have a stoichiometric composition of $[M_3O_{18/2}]^{3-}$, and the linking layer may have a stoichiometric composition of $[MT_2O_{14/2}]^+$.

According to another aspect of the present disclosure, a method of preparing the ion-conductive solid electrolyte compound includes: preparing a first raw material by mixing raw materials of A, M, and T and pulverizing the mixture; primarily heat-treating the first raw material; preparing a second raw material by pulverizing the primarily heat-treated first raw material by a wet ball milling process and mixing the resultant; compression-molding the second raw material; and sintering the compression-molded second raw material.

In an embodiment, a carbonate or nitrate compound of A may be used as the raw material of A, an oxide or halide of M may be used as the raw material of M, and an oxide salt compound of T may be used as the raw material of T.

In an embodiment, the primarily heat-treating of the first raw material may be performed at a temperature of about 500 to 1000° C. for about 6 to 12 hours, and the sintering of the second raw material may be performed at a temperature of 900 to 1200° C. for 12 to 48 hours.

In an embodiment, the ion-conductive solid electrolyte compound may be $LiTa_2PO_8$, $Li_2CO_3$ or $LiNO_3$ may be used as a raw material of lithium (Li), $(NH_4)_2HPO_4$, $(NH_4)H_2PO_4$, or $(NH_4)_3PO_4$ may be used as a raw material of phosphorus (P), $LiPO_3$ or $LiH_2PO_4$ may be used as raw materials of lithium and phosphorus, and $Ta_2O_5$ may be used as a raw material of tantalum (Ta).

According to another aspect of the present disclosure, an electrochemical device includes: a first electrode; a second electrode located to be spaced apart from the first electrode; and a solid electrolyte layer interposed between the first electrode and the second electrode, wherein the solid electrolyte layer is formed of the ion-conductive solid electrolyte compound according to the present disclosure.

In an embodiment, the solid electrolyte layer may have conductivity for at least one selected from the group consisting of lithium ions ($Li^+$), sodium ions ($Na^+$), hydrogen ions ($H^+$), and hydronium ions ($H_3O^+$).

In an embodiment, the electrochemical device may be one selected from a sodium ion battery, a sodium metal battery, a lithium ion battery, a lithium metal battery, a lithium-air (Li-Air) battery, a hydrogen fuel cell, a proton exchange membrane fuel cell, a Li-redox flow battery, a $Li-H_2O_2$ semi-fuel cell, and a chemical sensor.

Because the ion-conductive solid electrolyte compound according to the present disclosure has a new three-dimensional backbone structure that has not been disclosed in the related art, three-dimensional conduction of cations such as lithium ions, sodium ions, hydrogen ions, and hydronium ions is possible without a preferential direction and thermal and chemical stability of the ion-conductive solid electrolyte compound is excellent. As a result, the ion-conductive solid electrolyte compound according to the present disclosure may solve stability problems of liquid electrolytes and has very high cation conductivity and very low electronic conductivity. The ion-conductive solid electrolyte compound may be applied, as ion-conductive electrolyte material, to lithium-air (Li-Air) batteries, Li-redox flow batteries, $Li-H_2O_2$ semi-fuel cells, chemical sensors, and the like. Also, the ion-conductive solid electrolyte compound according to the present disclosure is very advantageous in commercial applications such as mass production due to a simple manufacturing process and low costs of raw materials.

DETAILED DESCRIPTION

Hereinafter, embodiments of the present disclosure will be described in detail with reference to the accompanying drawings. As the present disclosure below allows for various changes and numerous embodiments, particular embodiments will be illustrated in the drawings and described in detail in the written description. However, this is not intended to limit the present disclosure to particular modes of practice, and it is to be appreciated that all changes, equivalents, and substitutes that do not depart from the spirit and technical scope of the present invention are encompassed in the present disclosure. Throughout the specification, like reference numerals denote like elements.

The terms used herein are merely used to describe particular embodiments and are not intended to limit the present disclosure. An expression used in the singular encompasses the expression of the plural, unless it has a clearly different meaning in the context Hereinafter, it is to be understood that the terms such as "including" or "having" are intended to indicate the existence of features, steps, operations, components, parts, or combinations thereof disclosed in the specification, and are not intended to preclude the possibility that one or more other features, steps, operations, components, parts, or combinations thereof may exist or may be added.

Unless otherwise defined, technical and scientific terms used herein have the same meaning as commonly understood by one or ordinary skill in the art to which this application belongs. Terms defined in dictionaries generally used should be construed to have meanings matching with contextual meanings in the related art and are not to be construed as an ideal or excessively formal meaning unless otherwise defined herein.

Figure 1A:
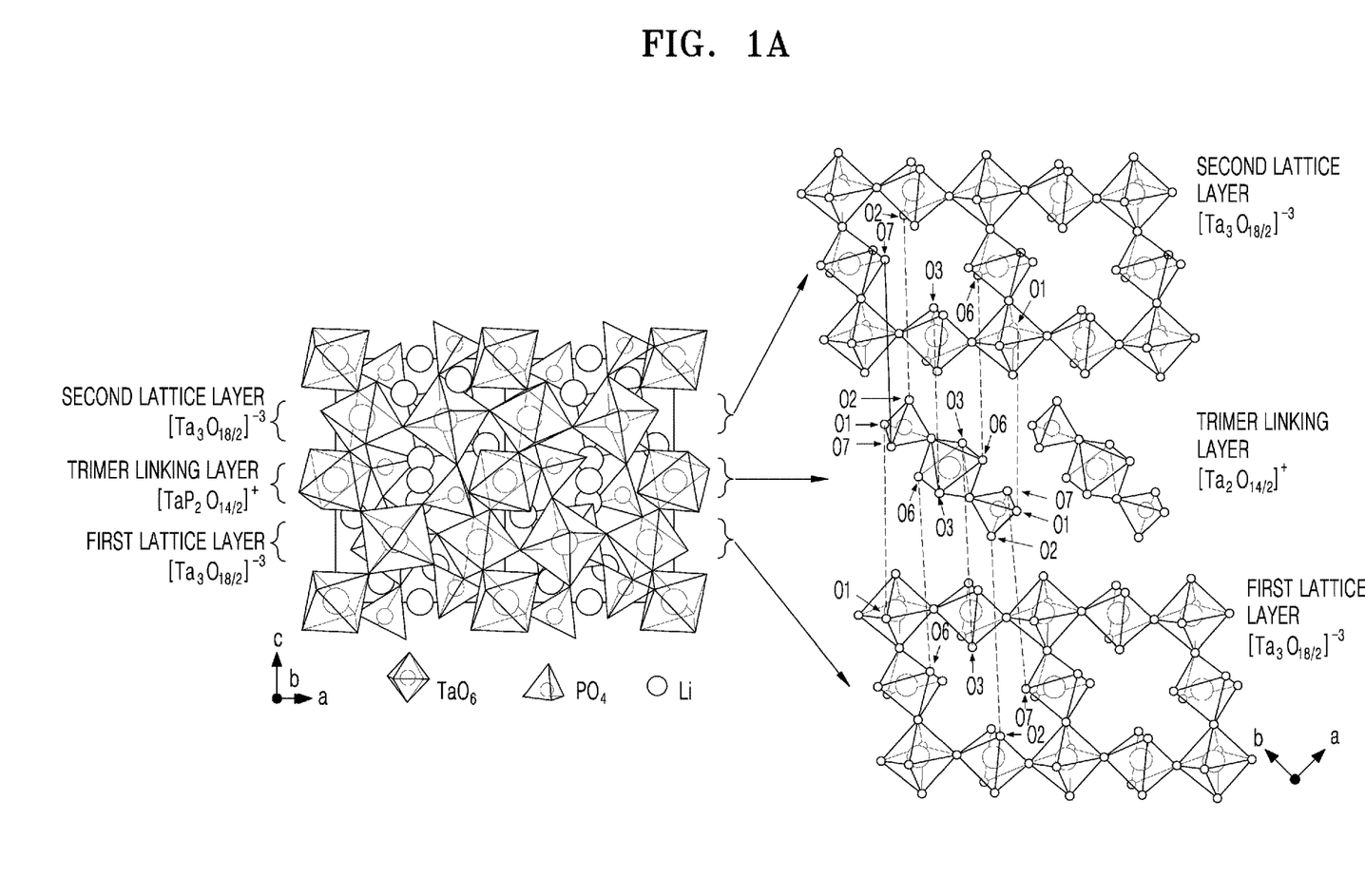
FIGS. 1A and 1B are views for describing a crystal structure of an ion-conductive solid electrolyte compound according to an embodiment of the present disclosure.
Figure 1B:
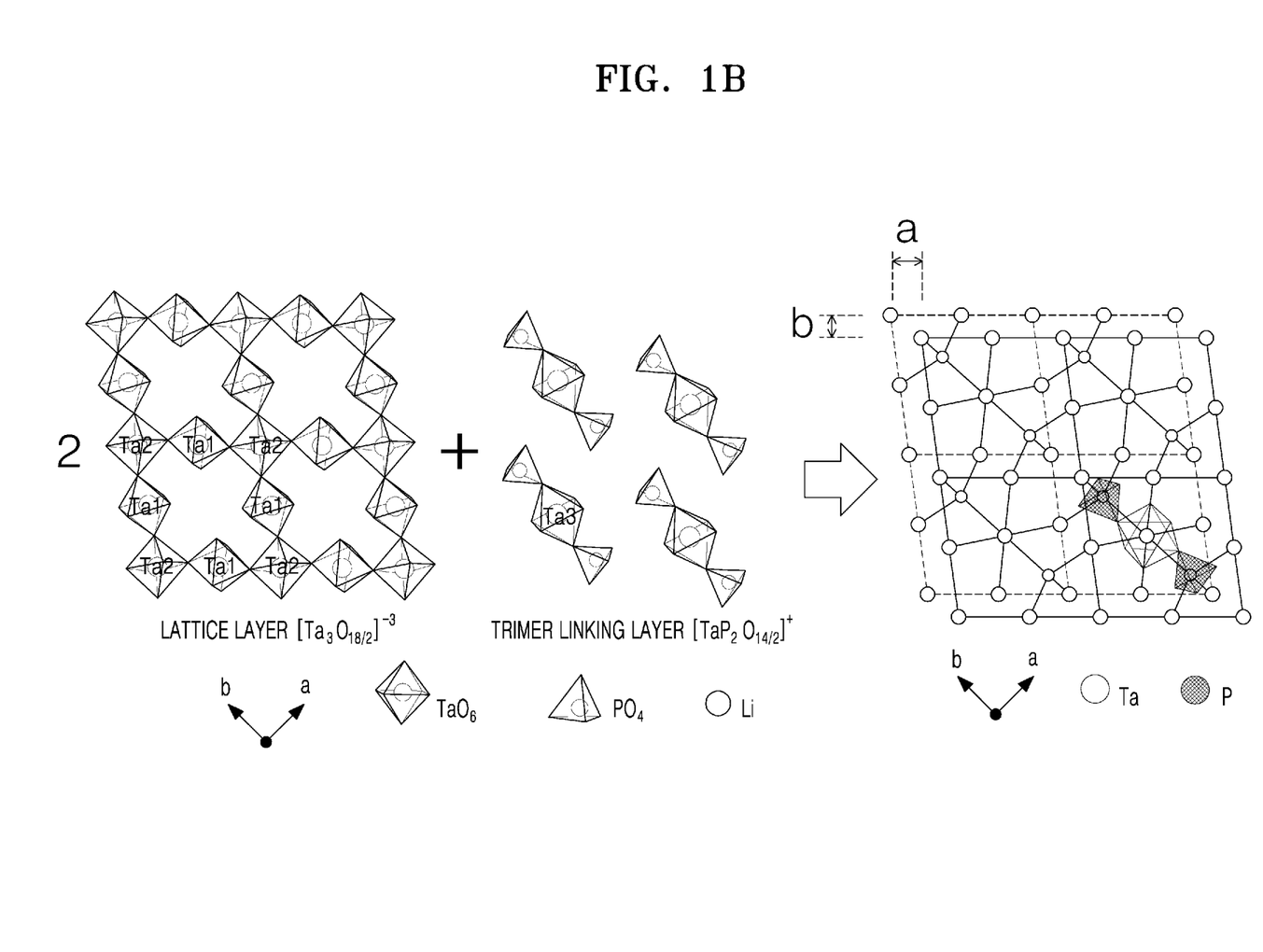

FIGS. 1A and 1B are views for describing a crystal structure of an ion-conductive solid electrolyte compound according to an embodiment of the present disclosure.

Referring to FIGS. 1A and 1B, the ion-conductive solid electrolyte compound according to an embodiment of the present disclosure, as a crystalline oxide, may have a stoichiometric formula represented by Formula 1 below and may have a high ionic conductivity.

$$A_x(M_2TO_8)_y \qquad \text{[Formula 1]}$$

In Formula 1, A may be a cation having an oxidation state of +1, M may be a cation having an oxidation state of +4, +5, or +6, and T may be a cation having an oxidation state of +4, +5, or +6. In addition, x and y may be each independently a real number greater than 0, and x may be a real number greater than 0 and equal to or less than 3y. For example, both x and y may be 1.

In an embodiment, A may include at least one selected from a lithium ion ($Li^+$), a sodium ion ($Na^+$), a hydrogen ion ($H^+$), and a hydronium ion ($H_3O^+$), M may include at least one selected from a titanium ion ($Ti^{4+}$), a zirconium ion ($Zr^{4+}$), a hafnium ion ($Hf^{4+}$), a niobium ion ($Nb^{5+}$), a tantalum ion ($Ta^{5+}$), and an antimony ion ($Sb^{5+}$), and T may include at least one selected from a silicon ion ($Si^{4+}$), a germanium ion ($Ge^{4+}$), a phosphorus ion ($P^{5+}$), an arsenic ion ($As^{5+}$), a vanadium ion ($V^{5+}$), a sulfur ion ($S^{6+}$), a molybdenum ion ($Mo^{6+}$), and a tungsten ion ($W^{6+}$). For example, T may include at least one selected from a germanium ion ($Ge^{4+}$), a phosphorus ion ($P^{5+}$), an arsenic ion ($As^{5+}$), and a vanadium ion ($V^{5+}$).

In the ion-conductive solid electrolyte compound according to an embodiment of the present disclosure, M may be 6-coordinated by oxygen anions to form a $MO_6$ octahedral unit, and T may be 4-coordinated by oxygen anions to form a $TO_4$ tetrahedral unit. In addition, some of the $MO_6$ octahedral units may respectively linked to two $TO_4$ tetrahedral units by sharing vertices, thereby forming trimer link units. In this regard, in each trimer link unit, the two $TO_4$ tetrahedral units may be linked to the $MO_6$ octahedral unit to share oxygen ions located at a first vertex of the $MO_6$ octahedral unit and a second vertex opposite to the first vertex.

In an embodiment, the ion-conductive solid electrolyte compound may include a first lattice layer formed of the $MO_6$ octahedral units linked in a quadrilateral lattice shape along an ab-plane, a second lattice layer located on the first lattice layer and formed of the $MO_6$ octahedral units linked in a quadrilateral lattice shape along the ab-plane, and a linking layer including the trimer link units connecting the first lattice layer with the second lattice layer. In an embodiment, in the first lattice layer and the second lattice layer, the $MO_6$ octahedral units may be linked in a quadrilateral, for example, rhombus, lattice shape.

In each of the first and second lattice layers, 8 $MO_6$ octahedral units may be arranged at positions corresponding to vertices and sides of a rhombus. In this case, $MO_6$ octahedral units located at positions corresponding to 4 vertices may be linked to 4 $MO_6$ octahedral units adjacent thereto by sharing vertices, thereby forming a first octahedral unit, and $MO_6$ octahedral units located at positions corresponding to 4 sides may be linked to two $MO_6$ octahedral units adjacent thereto by sharing vertices, thereby forming a second octahedral unit. In an embodiment, each of the first octahedral unit and the second octahedral unit may have a stoichiometric composition of $MO_{6/2}$.

Each of the first and second lattice layers formed as described above may have a stoichiometric composition corresponding to $[M_3O_{16/2}]^{3-}$. Meanwhile, the second lattice layer may be located on the first lattice layer in a state of being shifted from the first lattice layer by a first interval ('a') in an a-axis and a second interval ('b') in a b-axis.

In the linking layer, the $MO_6$ octahedral unit of the trimer link unit may be linked to two second octahedral units respectively located at two sides connected to the first vertex of the rhombus of the first lattice layer and two second octahedral units respectively located at two sides connected to the second vertex, opposite to the first vertex, of the rhombus of the second lattice layer by sharing vertices therewith. That is, the $MO_6$ octahedral unit of the trimer link unit may be linked to the four second octahedral units and two $TO_4$ tetrahedral units by sharing vertices therewith. In addition, one of the two $TO_4$ tetrahedral units of the trimer link unit may be linked to two second octahedral units respectively located at two sides connected to the second vertex of the rhombus of the first lattice layer and one first octahedral unit located at the second vertex of the rhombus of the second lattice layer by sharing vertices therewith. The other of the two $TO_4$ tetrahedral units of the trimer link unit may be linked to one first octahedral unit located at the first vertex of the rhombus of the first lattice layer and two second octahedral units respectively located at two sides connected to the first vertex of the rhombus of the second lattice layer by sharing vertices therewith. That is, each of the two $TO_4$ tetrahedral units of the trimer link unit may be linked to one $MO_6$ octahedral unit constituting the trimer link unit, two second octahedral units, and one first octahedral unit by sharing vertices therewith.

In this case, each of the first and second lattice layers may have a stoichiometric composition of $[M_3O_{18/2}]^{3-}$, and the linking layer may have a stoichiometric composition of $[MT_2O_{14/2}]^{3+}$.

The A ion may be arranged in space between the $MO_6$ octahedral units and the $TO_4$ tetrahedral units.

Because the ion-conductive solid electrolyte compound according to the present disclosure has a new three-dimensional backbone structure that has not been disclosed in the related art, three-dimensional conduction of cations such as lithium ions, sodium ions, hydrogen ions, and hydronium ions is possible without a preferential direction and thermal and chemical stability of the ion-conductive solid electrolyte compound is excellent. As a result, the ion-conductive solid electrolyte compound according to the present disclosure may solve stability problems of liquid electrolytes and has a very high cation conductivity and a very low electronic conductivity. The ion-conductive solid electrolyte compound may be applied, as ion-conductive electrolyte material, to sodium ion batteries, sodium metal batteries, lithium ion batteries, lithium metal batteries, lithium-air (Li-Air) batteries, hydrogen fuel cells, proton exchange membrane fuel cells, Li-redox flow batteries, Li—$H_2O_2$ semi-fuel cells, chemical sensors, and the like. Also, the ion-conductive solid electrolyte compound according to the present disclosure is very advantageous in commercial applications such as mass production due to a simple manufacturing process and low costs of raw materials.

Figure 2:
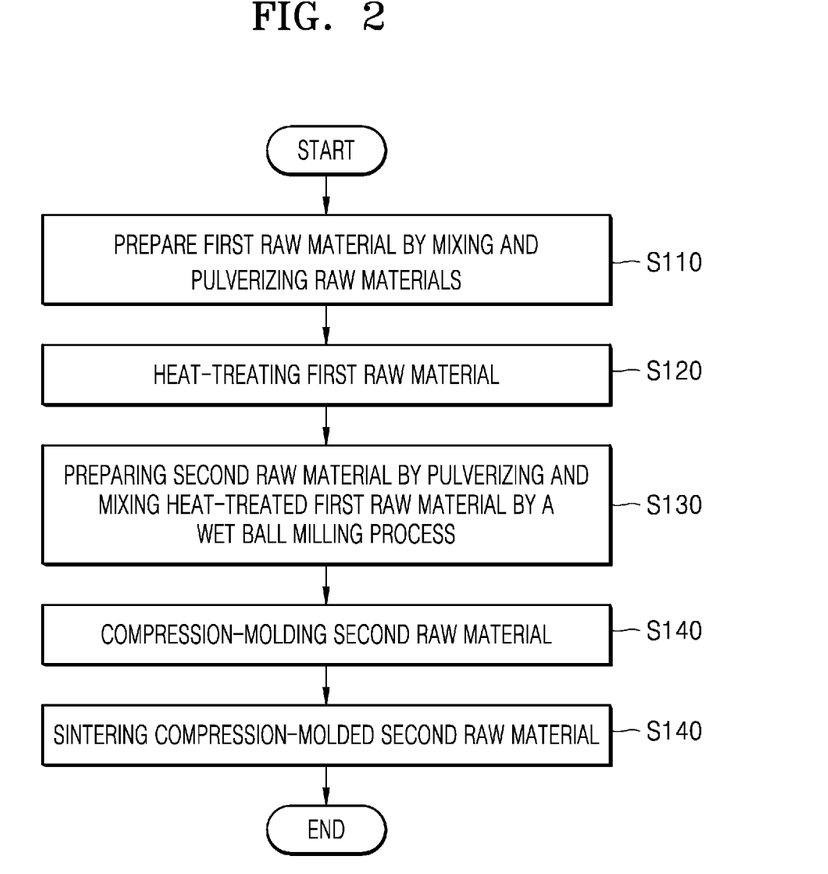
FIG. 2 is a flowchart for describing a method of preparing an ion-conductive solid electrolyte compound according to an embodiment of the present disclosure.

FIG. 2 is a flowchart for describing a method of preparing an ion-conductive solid electrolyte compound according to an embodiment of the present disclosure.

Referring to FIG. 2, a method of preparing an ion-conductive solid electrolyte compound according to an embodiment of the present disclosure is a method of preparing an ion-conductive solid electrolyte compound having a stoichiometric formula represented by Formula 1, the method including: preparing a first raw material by mixing raw materials to prepare a mixture and pulverizing the mixture (S110); primarily heat-treating the first raw material (S120); preparing a second raw material by pulverizing the primarily heat-treated first raw material by a wet ball milling process and mixing the resultant (S130); compression-molding the second raw material (S140); and sintering the compression-molded second raw material (S150).

In the preparing of the first raw material (S110), a compound such as a carbonate, nitrate, or the like of A may be used as a raw material of A, a compound such as an oxide, halide, or the like of M may be used as a raw material of M, and an oxide salt compound of T may be used as a raw material of T.

In an embodiment, when $LiTa_2PO_8$ is prepared as the ion-conductive solid electrolyte compound, $Li_2CO_3$, $LiNO_3$, or the like may be used as a raw material of lithium (Li), $Ta_2O_5$ may be used as a raw material of tantalum (Ta), and $(NH_4)_2HPO_4$, $(NH_4)H_2PO_4$, $(NH_4)_3PO_4$, or the like may be used as a raw material of phosphorus (P). Meanwhile, as another example, $LiPO_3$, $LiH_2PO_4$, or the like may be used as a raw material of lithium (Li) and phosphorus (P).

To prepare the first raw material, the raw materials of A, M, and T may be uniformly pulverized while mixing by mechanically rubbing the raw materials.

In the primarily heat-treating of the first raw material (S120), the uniformly pulverized and mixed raw materials may be heated at a temperature of about 500 to 1000° C. for about 6 to 12 hours. By the primary heat treatment, impurities and the like contained in the raw materials may volatilize to be removed.

In the preparing of the second raw material (S130), the first raw material may further be pulverized by a ball mill process using oxide balls, e.g., zirconium oxide balls, stable in a toluene solvent.

In the compression-molding of the second raw material (S140), the first raw material may be compression-molded in the form of pellets.

In the sintering of the compression-molded second raw material (S150), the second raw material compression-molded in the form of pellets may be sintered at a temperature of about 900 to 1200° C. for about 12 to 48 hours. In this regard, in the sintering process, the second raw material in the form of pellets may be sintered in a state of being covered with powder having the same composition to prevent loss of metal cations A with a +1 charge such as alkali metals. Through the sintering process, the second raw material may be crystallized.

In an embodiment of the present disclosure, the method of preparing the ion-conductive solid electrolyte compound according to an embodiment of the present disclosure may further include preparing a second ion-conductive solid electrolyte compound by exchanging a first ion, among A ions, included in a first ion-conductive solid electrolyte compound, with a second ion different from the first ion among A ions.

In an embodiment, in the first ion-conductive solid electrolyte compound including lithium ions ($Li^+$), the lithium ions ($Li^+$) are exchanged with hydrogen ions ($H^+$), hydronium ions ($H_3O^+$), or sodium ions ($Na^+$) via ion-exchange reaction to prepare the second ion-conductive solid electrolyte compound.

In an embodiment, $HTa_2PO_8$ or $HTa_2PO_8 \cdot H_2O$ may be prepared from $LiTa_2PO_8$ by exchanging lithium ions ($Li^+$) of $LiTa_2PO_8$ with hydrogen ions ($H^+$) or hydronium ions ($H_3O^+$). For example, lithium ions ($Li^+$) in the $LiTa_2PO_8$ lattice may be exchanged with hydrogen ions ($H^+$) or hydronium ions ($H_3O^+$) by ion-exchange reaction by mixing an acidic aqueous solution including hydrogen ions ($H^+$) or hydronium ions ($H_3O^+$) with $LiTa_2PO_8$ and heating the mixture to a predetermined temperature.

In this case, the acidic aqueous solution is not particularly limited as long as the acidic aqueous solution includes hydrogen ions ($H^+$) or hydronium ions ($H_3O^+$), and for example, nitric acid, hydrochloric acid, sulfuric acid, acetic acid, or the like may be used. For ion-exchange reaction between the lithium ions ($Li^+$) in the $LiTa_2PO_8$ lattice and hydrogen ions ($H^+$) or hydronium ions ($H_3O^+$) contained in the acidic aqueous solution, the mixed solution of $LiTa_2PO_8$ and the acidic aqueous solution may be heated at a temperature of about 40 to 100° C. for about 6 to 72 hours. In this case, the mixed solution may be continuously stirred using a stirrer for uniform reaction, and loss of the acidic aqueous solution may be prevented by using a reflux device during heating.

Meanwhile, after the ion-exchange reaction, the second ion-conductive solid electrolyte compound may be washed with water and ethanol and then dried at a temperature of 100° C. or higher.

In another embodiment, $NaTa_2PO_8$ may be prepared from $LiTa_2PO_8$ by exchanging lithium ions ($Li^+$) of $LiTa_2PO_8$ with sodium ions ($Na^+$). For example, lithium ions ($Li^+$) in the $LiTa_2PO_8$ lattice may be exchanged with sodium ions ($Na^+$) via ion-exchange reaction by adding $LiTa_2PO_8$ to a sodium salt in a molten state heated above a melting point thereof or by adding a sodium salt and $LiTa_2PO_8$ to an ionic solvent such as water to prepare a mixture and then heating the mixture to a predetermined temperature.

In this regard, as the sodium salt, any material capable of providing sodium ions in a molten or dissolved state may be used without limitation, and for example, sodium nitrate may be used. For ion-exchange reaction between the lithium ions ($Li^+$) in the $LiTa_2PO_8$ lattice and the sodium ions ($Na^+$), the solution may be heated at a temperature of about 40 to 380° C. for about 1 to 48 hours. When reaction with the sodium salt occurs in a solvent, the mixed solution may be continuously stirred using a stirrer for uniform reaction, and the loss of the solvent may be prevented using a reflux device during heating.

Meanwhile, after the ion-exchange reaction, the second ion-conductive solid electrolyte compound may be washed with water and ethanol and then dried at a temperature of 100° C. or higher.

Figure 3:
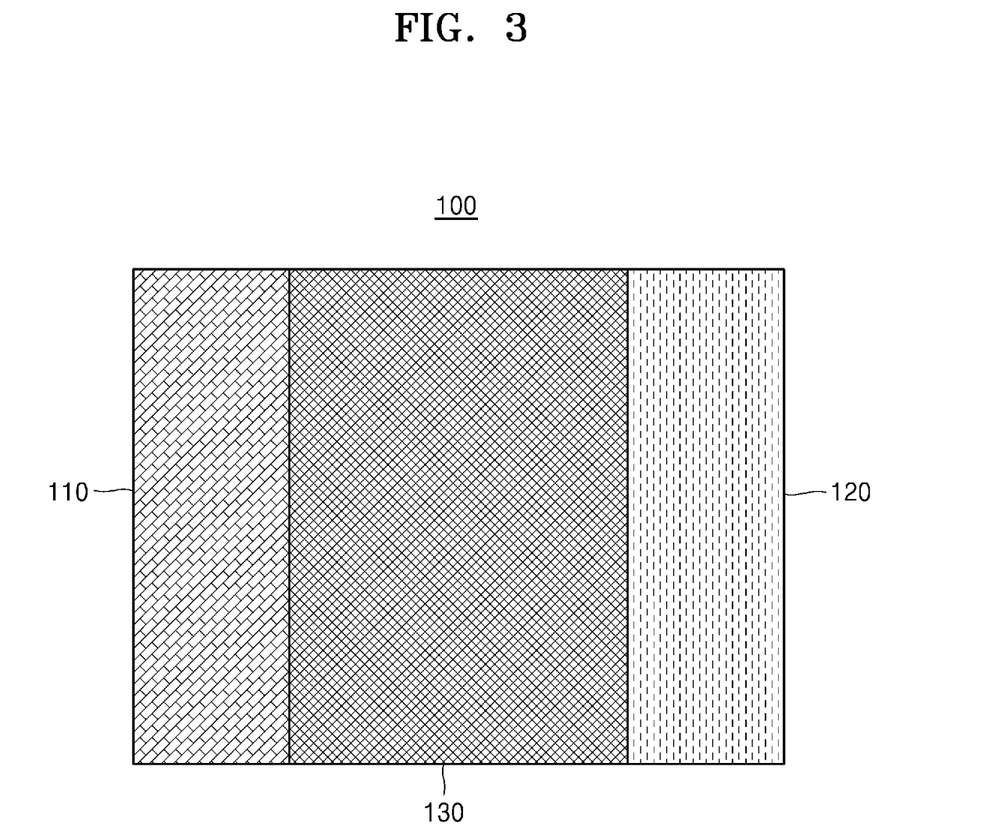
FIG. 3 is a cross-sectional view for describing an electrochemical device according to an embodiment of the present disclosure.

FIG. 3 is a cross-sectional view for describing an electrochemical device according to an embodiment of the present disclosure.

Referring to FIG. 3, an electrochemical device 100 according to an embodiment of the present disclosure may include a first electrode 110, a second electrode 120, and a solid electrolyte layer 130.

The first and second electrodes 110 and 120 may be formed of an electrically conductive material.

The solid electrolyte layer 130 may be interposed between the first and second electrodes and formed of the ion-conductive solid electrolyte compound according to an embodiment of the present disclosure as described above with reference to FIGS. 1A and 1B. The solid electrolyte layer 130 may have conductivity for at least one of A ions selected from lithium ions ($Li^+$), sodium ions ($Na^+$), hydrogen ions ($H^+$), and hydronium ions ($H_3O^+$).

The electrochemical device 100 according to the present disclosure is not particularly limited as long as the electrochemical device 100 requires an electrolyte layer having conductivity for lithium ions ($Li^+$), sodium ions ($Na^+$), hydrogen ions ($H^+$), hydronium ions ($H_3O^+$), or the like. For example, the electrochemical device 100 may be one selected from a sodium ion battery, a sodium metal battery, a lithium ion battery, a lithium metal battery, a lithium-air (Li-Air) battery, a hydrogen fuel cell, a proton exchange membrane fuel cell, a Li-redox flow battery, a $Li$—$H_2O_2$ semi-fuel cell, a chemical sensor, and the like.

In an embodiment, when the electrochemical device 100 is a sodium ion battery, the electrolyte layer 130 may be formed of an ion-conductive solid electrolyte compound in which A is sodium ions in Formula 1.

In another embodiment, when the electrochemical device 100 is a lithium ion battery, a Li-Air battery, a Li-redox flow battery, a $Li$—$H_2O_2$ semi-fuel cell, the electrolyte layer 130 may be formed of an ion-conductive solid electrolyte compound in which A is lithium ions in Formula 1.

In another embodiment, when the electrochemical device 100 is a hydrogen fuel cell, a proton exchange membrane fuel cell, or the like, the electrolyte layer 130 may be formed of an ion-conductive solid electrolyte compound in which A is hydrogen ions in Formula 1.

In another embodiment, when the electrochemical device 100 is a sodium ion battery, the electrolyte layer 130 may be formed of an ion-conductive solid electrolyte compound in which A is sodium ions in Formula 1.

Hereinafter, the present disclosure will be described in more detail with reference to the following examples. However, the following experimental examples are merely presented to exemplify the present disclosure, and the scope of the present disclosure is not limited thereto.

EXAMPLES

Example 1

$LiH_2PO_4$ and $Ta_2O_5$ were mixed in a stoichiometric ratio and pulverized using a mortar and the resultant was heated in the air at 600° C. for 8 hours, and then the mixture obtained therefrom was mixed again and heated at 1000° C. for 8 hours and the mixture obtained therefrom was pulverized using zirconium balls in toluene for 1 hour.

Then, the pulverized powder was compression-molded in the form of pellets each having a diameter of 1.05 cm and a thickness of 0.21 cm, and the pellets were sintered at 1050° C. for 12 hours. In this case, the pellets were sintered in a state of being covered with powder having the same composition to prevent the loss of lithium.

Experimental Example

Figure 4A:
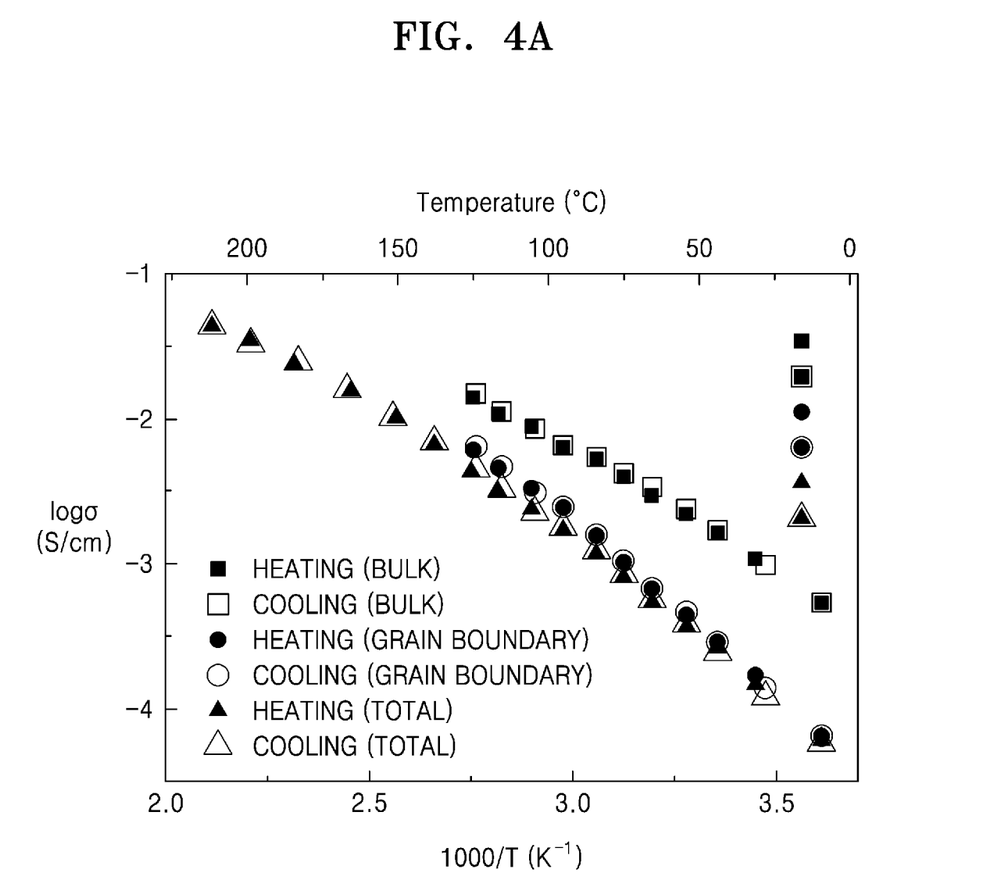
FIGS. 4A and 4B are graphs illustrating ion-conductivity of $LiTa_2PO_8$ pellets prepared according to Example 1 measured according to temperature.
Figure 4B:
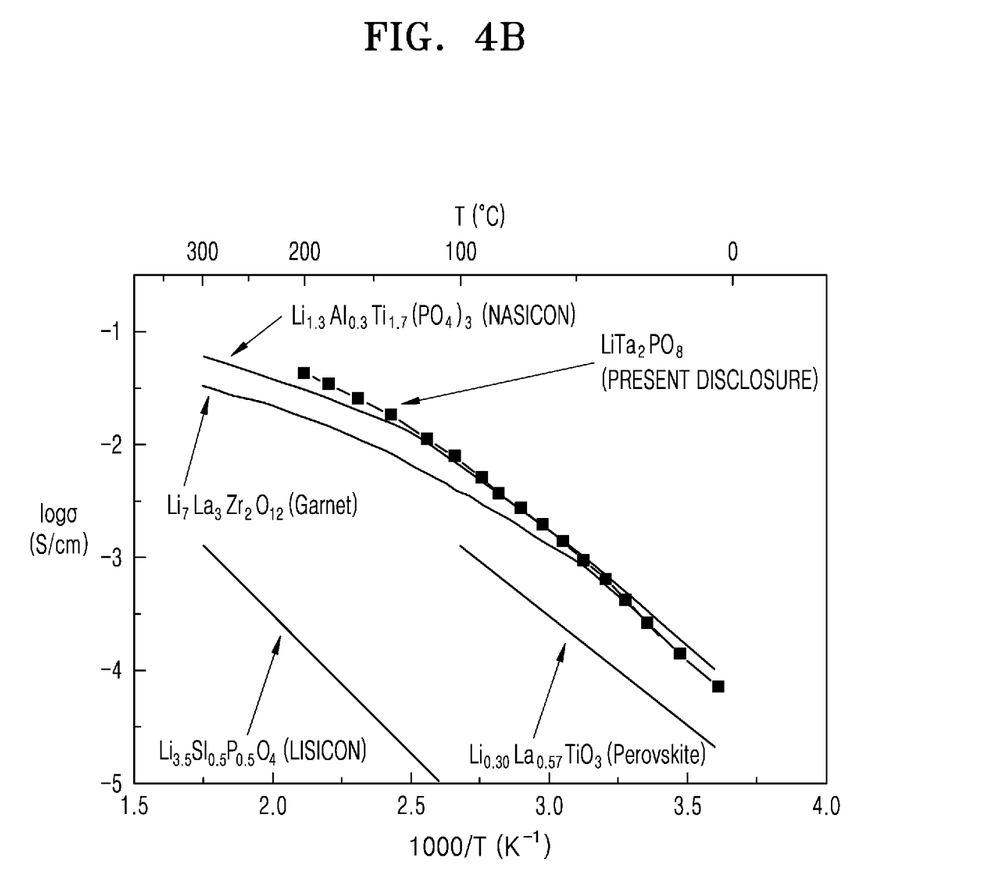

Ionic conductivity of the $LiTa_2PO_8$ pellets prepared according to Example 1 was measured at various temperatures and the results are shown not only in Table 1 below and FIG. 4A but also in FIG. 4B showing comparison results with conventional ion-conductive solid electrolyte materials.

TABLE 1

| Temperature (° C.) | σ Bulk ($Scm^{-1}$) | σ Grain boundary ($Scm^{-1}$) | σ Total ($Scm^{-1}$) |
|---|---|---|---|
| 4 | $5.38 \times 10^{-4}$ | $6.68 \times 10^{-5}$ | $5.86 \times 10^{-5}$ |
| 17 | $1.08 \times 10^{-3}$ | $1.69 \times 10^{-4}$ | $1.46 \times 10^{-4}$ |
| 25 | $1.63 \times 10^{-3}$ | $2.92 \times 10^{-4}$ | $2.48 \times 10^{-4}$ |
| 32 | $2.19 \times 10^{-3}$ | $4.44 \times 10^{-4}$ | $3.69 \times 10^{-4}$ |
| 40 | $2.97 \times 10^{-3}$ | $6.79 \times 10^{-4}$ | $5.52 \times 10^{-4}$ |
| 47 | $3.98 \times 10^{-3}$ | $1.02 \times 10^{-2}$ | $8.11 \times 10^{-4}$ |
| 54 | $5.29 \times 10^{-3}$ | $1.57 \times 10^{-3}$ | $1.21 \times 10^{-3}$ |
| 63 | $6.37 \times 10^{-3}$ | $2.44 \times 10^{-3}$ | $1.76 \times 10^{-3}$ |
| 72 | $8.67 \times 10^{-3}$ | $3.31 \times 10^{-3}$ | $2.40 \times 10^{-3}$ |
| 82 | $1.09 \times 10^{-2}$ | $4.57 \times 10^{-3}$ | $3.22 \times 10^{-3}$ |
| 90 | $1.40 \times 10^{-2}$ | $6.09 \times 10^{-3}$ | $4.24 \times 10^{-3}$ |
| 103 | | | $6.88 \times 10^{-3}$ |
| 117 | | | $1.03 \times 10^{-2}$ |
| 135 | | | $1.57 \times 10^{-2}$ |
| 159 | | | $2.47 \times 10^{-2}$ |
| 180 | | | $3.37 \times 10^{-2}$ |
| 200 | | | $4.40 \times 10^{-2}$ |

Referring to Table 1 and FIGS. 4A and 4B, it may be confirmed that the $LiTa_2PO_8$ compound prepared according to Example 1 has high ionic conductivity over the entire range of temperatures of measurement. Particularly, at room temperature (25° C.), a bulk conductivity was $1.6 \times 10^{-3}$ $Scm^{-1}$, and a total conductivity including the bulk and grain boundary was $2.9 \times 104$ $Scm^{-1}$, which exceeds the highest level of conductivity reported to date in any other oxide-based solid electrolytes.

Figure 5:
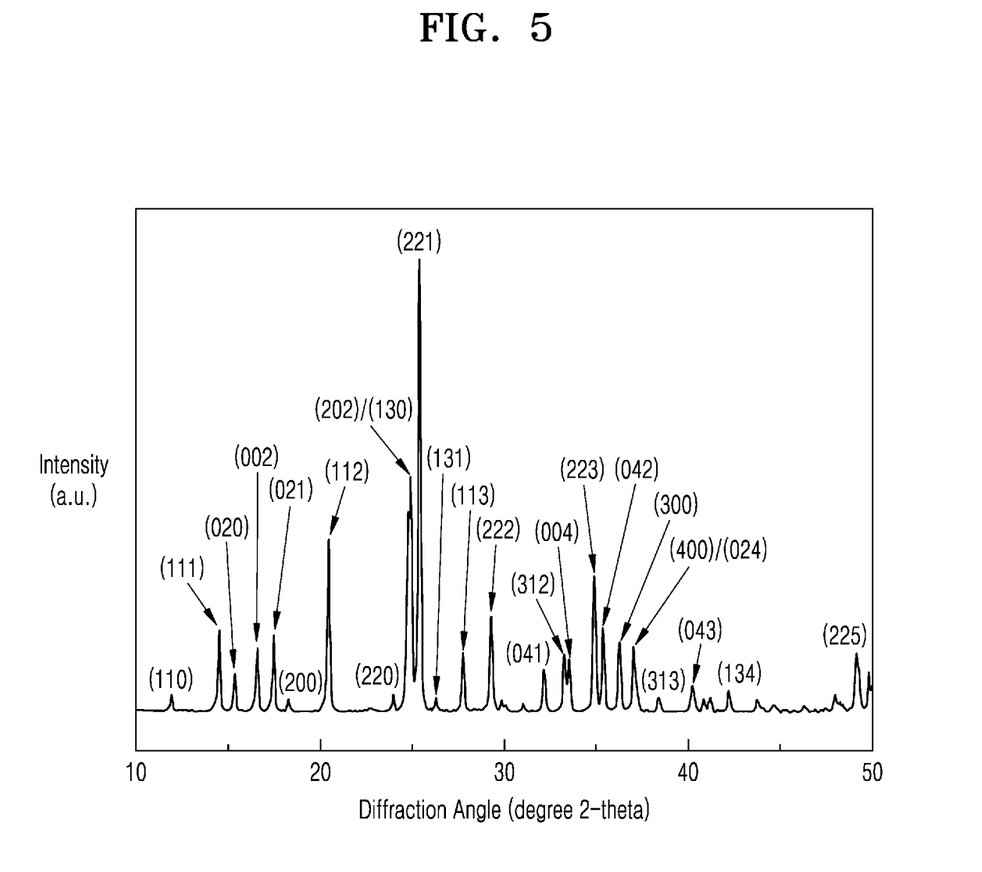
FIG. 5 is a graph illustrating X-ray diffraction ($\lambda$=1.5418 Å) of $LiTa_2PO_8$ pellets prepared according to Example 1.

FIG. 5 is a graph illustrating X-ray diffraction ($\lambda = 1.5418$ Å) of $LiTa_2PO_8$ pellets prepared according to Example 1.

Referring to FIG. 5, it may be confirmed that $LiTa_2PO_8$ prepared according to Example 1 has a crystal structure. Specifically, $LiTa_2PO_8$ prepared according to Example 1 has a monoclinic space group and a crystal structure having lattice constants of a≈9.716 Å, b≈11.536 Å, c≈10.697 Å, and β=90.04°.

Figure 6:
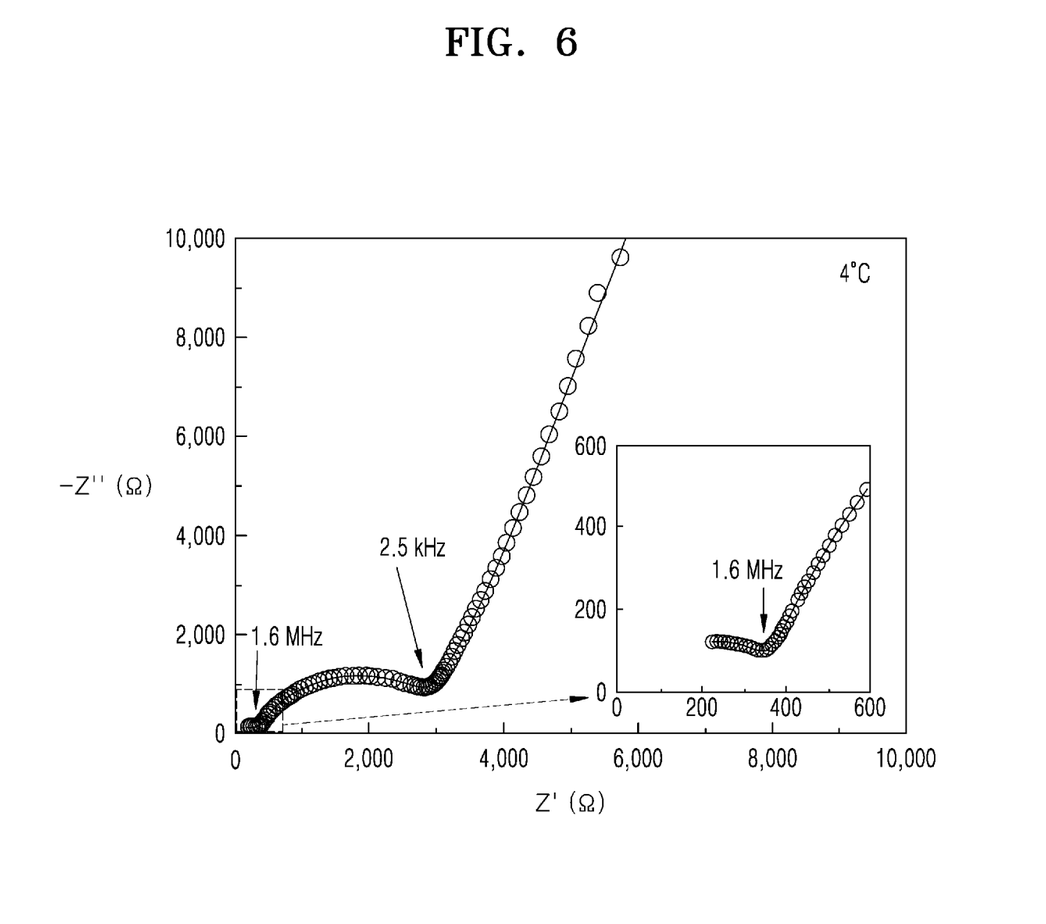
FIG. 6 is a graph illustrating AC impedance measured for $LiTa_2PO_8$ pellets prepared according to Example 1.

FIG. 6 is a graph illustrating AC impedance of $LiTa_2PO_8$ pellets prepared according to Example 1.

The graph of FIG. 6 shows AC impedance of $LiTa_2PO_8$ pellets, which were prepared according to Example 1 and have a thickness of 0.21 cm and a diameter of 1.05 cm, measured in the air at 4° C., wherein each dot indicates an experimental value measured at a frequency of 5 Hz to 13 MHz, and a continuous line indicates simulation data of an equivalent circuit corresponding to ($R_b CPE_b$)($R_{gb} CPE_{gb}$) ($CPE_{el}$) using a ZView program. Here, R is resistance, CPE is constant phase element, and indices b, gb, and el indicate bulk, grain boundary, and electrode, respectively. In this case, it may be confirmed that small semicircles observed at a high frequency above 1.6 MHz, big semicircles observed in a frequency of 1.6 MHz to 2.5 kHz, and a linear graph observed at a low frequency below 2.5 kHz are caused by bulk, grain boundary, and electrode, respectively, based on CPE values. Resistance of bulk may be obtained from diameters of the small semicircles and resistance of grain boundary may be determined by diameters of the big semicircles. When the resistances are substituted into Equation 1 below, a bulk conductivity of $5.38 \times 10^{-4}$ Scm$^{-1}$, a grain boundary conductivity of $6.58 \times 10^{-5}$ Scm$^{-1}$, and a total conductivity of $5.86 \times 10^{-5}$ Scm$^{-1}$ are calculated.

$$\text{Ionic conductivity } (\sigma) = \frac{1}{\text{Resistance }(R)} \times \frac{\text{Thickness of sample }(l)}{\text{Width of sample }(A)} \quad \text{[Equation 1]}$$

While exemplary embodiments have been shown and described above, it will be apparent to those skilled in the art that modifications and variations could be made without departing from the scope of the present disclosure as defined by the appended claims.

The invention claimed is:

1. An ion-conductive solid electrolyte compound comprising:
an oxide represented by Formula 1

$$A_x(M_2TO_8)_y \quad \text{[Formula 1]}$$

wherein in Formula 1,
A is a cation having an oxidation state of +1,
M is a cation having an oxidation state of +4, +5, or +6,
T is a cation having an oxidation state of +4, +5, or +6, and
x and y are each independently a real number greater than 0, wherein x is equal to or less than 3y, wherein
in a crystal structure of the compound of Formula 1, M is 6-coordinated by oxygen to form a MO$_6$ octahedral unit, and T is 4-coordinated by oxygen to form a TO$_4$ tetrahedral unit, and
the crystal structure of the ion-conductive solid electrolyte compound comprises:
a first lattice layer formed of MO$_6$ octahedral units linked to each other in a quadrilateral lattice shape along a first plane;
a second lattice layer formed of MO$_6$ octahedral units linked to each other in a quadrilateral lattice shape along a second plane parallel to the first plane; and
a linking layer between the first lattice layer and the second lattice layer, the linking layer including trimer link units, each trimer link unit comprising one MO$_6$ octahedral unit between two TO$_4$ tetrahedral units, wherein the linking layer binds to the MO$_6$ octahedral units of the first lattice layer and to MO$_6$ octahedral units of the second lattice layer, and
wherein A is between the MO$_6$ octahedral units and the TO$_4$ tetrahedral units.

2. The ion-conductive solid electrolyte compound of claim 1, wherein
A comprises at least one of a lithium ion (Li$^+$), a sodium ion (Na$^+$), a hydrogen ion (H$^+$), or a hydronium ion (H$_3$O$^+$),
M comprises at least one of a titanium ion (Ti$^{4+}$), a zirconium ion (Zr$^{4+}$), a hafnium ion (Hf$^{4+}$), a niobium ion (Nb$^{5+}$), a tantalum ion (Ta$^{5+}$), or an antimony ion (Sb$^{5+}$), and
T comprises at least one of a silicon ion (Si$^{4+}$), a germanium ion (Ge$^{4+}$), a phosphorus ion (P$^{5+}$), an arsenic ion (As$^{5+}$), a vanadium ion (V$^{5+}$), a sulfur ion (S$^{6+}$), a molybdenum ion (Mo$^{6+}$), or a tungsten ion (W$^{6+}$).

3. The ion-conductive solid electrolyte compound of claim 1, wherein
in each of the first and second lattice layers, 8 MO$_6$ octahedral units are arranged at positions corresponding to 4 vertices and 4 sides of a quadrilateral, MO$_6$ octahedral units located at positions corresponding to 4 vertices are linked to 4 MO$_6$ octahedral units adjacent thereto by sharing vertices, thereby forming a first octahedral unit, and
MO$_6$ octahedral units located at positions corresponding to 4 sides are linked to two MO$_6$ octahedral units adjacent thereto by sharing vertices, thereby forming a second octahedral unit.

4. The ion-conductive solid electrolyte compound of claim 3, wherein
the second lattice layer is shifted relative to the first lattice layer by a first interval and a second interval respectively in a first axis and a second axis defining the first plane and the second plane.

5. The ion-conductive solid electrolyte compound of claim 3, wherein
the MO$_6$ octahedral unit of the trimer link unit is linked to two second octahedral units respectively located at two sides connected to a first vertex of a first quadrilateral of the first lattice layer and two second octahedral units respectively located at two sides connected to a second vertex, opposite to a first vertex, of a second quadrilateral of the second lattice layer by sharing vertices therewith,
one of the two TO$_4$ tetrahedral units of the trimer link unit is linked to two second octahedral units respectively located at positions corresponding to two sides connected to a second vertex of the first quadrilateral and one first octahedral unit located at positions corresponding to the second vertex of the second quadrilateral by sharing vertices therewith, and
the other of the two TO$_4$ tetrahedral units of the trimer link unit is linked to one first octahedral unit located at a position corresponding to the first vertex of the first quadrilateral and two second octahedral units respectively located at positions corresponding to two sides connected to the first vertex of the second quadrilateral by sharing vertices therewith.

6. The ion-conductive solid electrolyte compound of claim 1,
wherein each of the first and second lattice layers has a stoichiometric composition of [M$_3$O$_{18/2}$]$^{3-}$, and
the linking layer has a stoichiometric composition of [MT$_2$O$_{14/2}$]$^+$.

7. A method of preparing an ion-conductive solid electrolyte compound of claim 1, the method comprising:
mixing raw materials of A, M, and T to prepare a mixture and pulverizing the mixture to prepare a first raw material;
heat-treating the first raw material;
pulverizing the heat-treated first raw material by a wet ball milling process and mixing the pulverized first raw material to prepare a second raw material;
compression-molding the second raw material; and
sintering the compression-molded second raw material to prepare the ion-conductive solid electrolyte compound.

8. The method of claim 7, wherein
the raw material of A is a carbonate or a nitrate compound of A,
the raw material of M is an oxide or a halide of M, and
the raw material of T is an oxide of T.

9. The method of claim 7, wherein
the heat-treating of the first raw material is performed at a temperature of about 500 to about 1000° C. for about 6 hours to about 12 hours, and the sintering of the second raw material is performed at a temperature of about 900° C. to about 1200° C., for about 12 hours to about 48 hours.

10. The method of claim 7, wherein
the ion-conductive solid electrolyte compound is $LiTa_2PO_8$, and
the raw materials of A, M, and T comprise $Li_2CO_3$, $LiNO_3$, $(NH_4)_2HPO_4$, $(NH_4)H_2PO_4$, $(NH_4)_3PO_4$, $LiPO_3$, $LiH_2PO_4$, or $Ta_2O_5$.

11. The method of claim 7,
further comprising exchanging a first A ion of the ion-conductive solid electrolyte compound with a second A ion, wherein the first A ion and the second A ion are different.

12. The method of claim 11, wherein
the first A ion is $Li^+$, and the second A ion is $H^+$ or $H_3O^+$, and
the exchanging comprises mixing $LiTa_2PO_8$ with an acidic aqueous solution including $H^+$ or $H_3O^+$ to prepare a mixture, and
heating the mixture to prepare the ion-conductive solid electrolyte, wherein the ion-conductive solid electrolyte compound is $HTa_2PO_8$ or $HTa_2PO_8 \cdot H_2O$.

13. The method of claim 11, wherein
the first A ion is $Li^+$, and the second A ion is $Na^+$, and
the exchanging comprises mixing $LiTa_2PO_8$ with a molten sodium salt or a solvent in which a sodium salt is dissolved to prepare a mixture, and
heating the mixture to prepare the ion-conductive solid electrolyte, wherein the ion-conductive solid electrolyte compound is $NaTa_2PO_8$.

14. An electrochemical device comprising:
a first electrode;
a second electrode spaced apart from the first electrode; and
a solid electrolyte layer interposed between the first electrode and the second electrode,
wherein the solid electrolyte layer comprises the ion-conductive solid electrolyte compound according of claim 1.

15. The electrochemical device of claim 4, wherein
the solid electrolyte layer has a conductivity for at least one ion of a lithium ion ($Li^+$), a sodium ion ($Na^+$), a hydrogen ion ($H^+$), or a hydronium ion ($H_3O^+$).

16. The electrochemical device of claim 14, wherein
the electrochemical device is a sodium ion battery, a sodium metal battery, a lithium ion battery, a lithium metal battery, a lithium-air battery, a hydrogen fuel cell, a proton exchange membrane fuel cell, a Li-redox flow battery, a Li—$H_2O_2$ semi-fuel cell, or a chemical sensor.

17. The electrochemical device of claim 14, wherein
the electrochemical device is a lithium ion battery, a lithium metal battery, a lithium-air battery, a Li-redox flow battery, or a Li—$H_2O_2$ semi-fuel cell, and
the electrolyte layer comprises an ion-conductive solid electrolyte compound in which A of Formula 1 is a lithium ion.

18. The electrochemical device of claim 14, wherein
the electrochemical device is a hydrogen fuel cell or a proton exchange membrane fuel cell, and
the electrolyte layer comprises an ion-conductive solid electrolyte compound in which A of Formula 1 is a hydrogen ion.

19. The electrochemical device of claim 14, wherein
the electrochemical device is a sodium ion battery, a sodium metal battery, or a sodium-air (Na-Air) battery, and
the electrolyte layer comprises an ion-conductive solid electrolyte compound in which A of Formula 1 is a sodium ion.

\* \* \* \* \*